United States Patent
Ruth et al.

(10) Patent No.: US 9,660,742 B2
(45) Date of Patent: *May 23, 2017

(54) DETECTING SIGNAL LEAKAGE IN CABLE NETWORKS

(71) Applicant: VIAVI SOLUTIONS INC., Milpitas, CA (US)

(72) Inventors: Al Ruth, Indianapolis, IN (US); Rodney Harbison Weaver, Macon, GA (US); Koji Okamoto, Indianapolis, IN (US)

(73) Assignee: VIAVI SOLUTIONS INC., Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/169,318

(22) Filed: May 31, 2016

(65) Prior Publication Data

US 2016/0277131 A1 Sep. 22, 2016

Related U.S. Application Data

(63) Continuation of application No. 14/704,302, filed on May 5, 2015, now Pat. No. 9,379,829.

(60) Provisional application No. 61/988,821, filed on May 5, 2014.

(51) Int. Cl.
| | |
|---|---|
| *H04B 3/46* | (2015.01) |
| *H04B 17/354* | (2015.01) |
| *H04L 27/34* | (2006.01) |
| *H04B 3/32* | (2006.01) |

(52) U.S. Cl.
CPC ............ *H04B 17/354* (2015.01); *H04B 3/32* (2013.01); *H04L 27/34* (2013.01)

(58) Field of Classification Search
CPC ............ H04L 2025/0342; H04L 47/21; H04L 27/2614; H04L 27/34; H04B 17/345; H04B 17/354; H04B 3/32; H04B 10/25753; H04B 1/1027; H04B 1/69; H04B 3/46; H04W 88/085; H04W 24/02; H04H 20/12; H04H 20/07
USPC ........ 375/224, 260, 346, 257, 261; 725/107, 725/129, 125, 118; 455/226.1, 454,
(Continued)

(56) References Cited

U.S. PATENT DOCUMENTS

| | | |
|---|---|---|
| 6,915,530 B1 | 7/2005 | Kauffman |
| 9,112,762 B2 | 8/2015 | Murphy |
| 9,379,829 B2 * | 6/2016 | Ruth ................. H04L 27/34 |

(Continued)

OTHER PUBLICATIONS

R&S® EFL110/ R&S® EFL210 Cable TV Analyzer and Leakage Detector Detecting interference in cable TV and LTE Networks, Rohde & Schwarz, Mar. 2014 2013.

(Continued)

*Primary Examiner* — Rahel Guarino
(74) *Attorney, Agent, or Firm* — Mannava & Kang, P.C.

(57) ABSTRACT

A signal leakage in a cable network may be detected by using a test device to obtain a spectrum of an electromagnetic wave propagating in vicinity of the cable network, and automatically detecting QAM channels in the obtained spectrum by detecting characteristic spectral roll-offs at boundary frequencies between QAM channels of the cable network. A test device may be used to determine which QAM channels are currently active on the cable network, thereby facilitating automatic QAM signal leakage detection.

20 Claims, 9 Drawing Sheets

(58) Field of Classification Search
USPC ....... 455/67.11, 115.1, 114.2, 63.1; 324/527; 340/552
See application file for complete search history.

(56) References Cited

U.S. PATENT DOCUMENTS

2013/0316750 A1    11/2013    Couch
2014/0282783 A1    9/2014     Totten
2015/0029869 A1    1/2015     Wolcott

OTHER PUBLICATIONS

Ron Hranac, et al., UHF Signal Leakage and Ingress Understanding the Challenges A Technical paper prepared for the Society of Cable Telecommunication Engineers, Cable-Tec Expo'13 Oct. 21-24, 2013.
White Paper: Detecting Leakage of Digital Channels in an HFC Network, Arcom digital, 2012.
QAM™ Sniffer® Leak Detection, Digital Leak Detection, ComSonics, Inc. 2012.

* cited by examiner

DETECTING SIGNAL LEAKAGE IN CABLE NETWORKS

CROSS-REFERENCE TO RELATED APPLICATIONS

The present invention claims priority from U.S. Patent Application No. 61/988,821 filed May 5, 2014, which is incorporated herein by reference.

TECHNICAL FIELD

The present disclosure relates to network test equipment and methods, and in particular to detecting signal leakage in cable networks.

PRIORITY

The present invention is a Continuation of commonly assigned and co-pending U.S. patent application Ser. No. 14/704,302, filed May 5, 2015, which claims priority from U.S. Patent Application Ser. No. 61/988,821 filed May 5, 2014 the disclosures of which are hereby incorporated by refence in their entireties.

BACKGROUND

Communications systems may use radio-frequency (RF) electromagnetic signals to communicate information. The RF electromagnetic signals used for communication may include free-space radio waves propagating in air, guided electromagnetic waves propagating in coaxial cable, or both. A concept of so-called "frequency reuse" allows cable operators to reuse the air RF frequencies by carrying within the cable networks signals at frequencies overlapping with the air RF frequencies. The frequency reuse is made possible by the electromagnetic shielding effect exhibited by coaxial cables.

In bidirectional cable networks, upstream, i.e. towards the headend, and downstream, i.e. away from the headend, signals occupy separate frequency bands called upstream and downstream spectral bands. In the United States, the upstream spectral band typically spans from 5 MHz to 42 MHz, while the downstream spectral band typically spans from 50 MHz to 1000 MHz. Together, the upstream and downstream spectral bands overlap a so-called Very High Frequency (VHF) band spanning between 30 MHz and 300 MHz. Downstream spectral band also partially overlaps a so-called Ultra High Frequency (UHF) band spanning between 300 MHz and 3 GHz.

Ideally, cable network signals do not interfere with the over-the-air signals. However, when the cable shielding, or shielding of cable network components is degraded or compromised for some reason, e.g. improper installation, rodent chews, etc., electromagnetic signals propagating in the cable network may leak out to the over-the-air environment, and vice versa. If the leakage field is sufficiently strong, interference between over-the-air and guided electromagnetic waves may occur, causing service quality degradation in over-the-air communications, cable communications, or both. The impact of signal leakage on over-the-air users may, depending on the ratio of the desired signal strength to the leakage strength and other factors, cause a mild or moderate degradation, or may even cause a complete signal disruption in extreme cases.

Licensed over-the-air users must be able to operate without interference degrading or disrupting their services. Paragraph 76.613 of Telecommunications Chapter I of Federal Communications Commission (FCC) states: "An MVPD that causes harmful interference shall promptly take appropriate measures to eliminate the harmful interference." If a leakage-related interference occurs, the operator of the cable network causing the leakage must fix the problem. In cases where the interference may impact "safety of life and protection of property", the FCC has an authority to require a cable operator to shut down offending signals until the problem has been resolved. Clearly, this represents a serious concern for cable network operators.

Although FCC Rules specify signal leakage limits over a wide range of frequencies, the emphasis is made in the Rules on the aeronautical band spanning between 108 MHz and 137 MHz, which is within the VHF band. This is perhaps why the signal leakage has been historically monitored mostly in the aeronautical band. Furthermore, the assumption has been that absence of leakage in the aeronautical band indicates the likely absence of leakage at other frequencies as well.

Recently, new data has emerged indicating that some frequencies may be radiated much more efficiently from a leakage location than others. Depending on the nature and geometry of the leak, there may be little VHF leakage and significant UHF leakage, and vice versa. Thus, UHF leakage still needs to be measured, even when the VHF leakage is measured. Measuring UHF leakage has become increasingly important in view of a growing cellular network usage, in particular in Long Term Evolution (LTE) spectral band. The LTE band spans between 698 MHz and 960 MHz, which is in the UHF frequency band. UHF leakage in the 470-698 MHz range may affect antenna-based TV reception and some non-TV services that may exist in the 470-698 MHz range.

For technical reasons, measuring leakage in the UHF band has proven much more difficult than in the VHF band. To provide adequate sensitivity, the VHF leakage has typically been monitored using a resonant antenna tuned to an injected "tag" signal having a very narrow bandwidth of 10-15 KHz. Digitally-modulated UHF leaking signals are much broader in bandwidth than 10-15 KHz, and often appear noise-like in a frequency spectrum. For instance, quadrature amplitude modulated (QAM) signals occupy 6 MHz or 8 MHz frequency band per channel, and there may be many (up to a hundred or more) leaking downstream QAM channels in the UHF band, increasing the total radiated bandwidth to tens, and perhaps hundreds of megahertz. Because of this, UHF signals are more difficult to detect than VHF signals.

One known approach to monitoring cable network signal leaks in the UHF band is to provide a narrowband UHF pilot signal between two active QAM carrier signals, preferably at a lower level than the adjacent active carriers, to avoid disturbing the latter; and to provide field test equipment tuned to detect the pilot signal. Thus, the pilot signal operates as an indicator of signals leaked from a cable network under test. The field test equipment may be outfitted with global positioning system (GPS) locators for automatic mapping of the pilot signal detected in the field, as a truck carrying the test equipment is driven in vicinity of the cable network. Detrimentally, this method requires modification of the downstream cable signal at the headend of the cable network, which may be expensive to implement. Furthermore, the leaking signal in the UHF band may be highly frequency dependent. Therefore, the strength of a narrowband pilot signal may not always be representative of the strength of an actual leaking downstream cable signal.

Another approach to monitor UHF signal leaks in a cable network includes disposing a detector proximate a QAM modulator source for sampling the source QAM signal. These samples are then transmitted to a field device, which compares off-air measured signals to the received samples by computing, in real time, a time-domain correlation function. If the source samples and field samples match, then the signal is identified as leaking out of the cable network. Although this approach does not require pilot signals, in that the QAM signal itself is used as a "pilot" signal, this approach does require a modification of the headend equipment. Furthermore, field test equipment needs to be upgraded with test devices including complex digital signal processors and correlators, to determine a real-time match of QAM time traces. This makes the testing solution based on signal correlation rather costly, as well.

Yet another approach to monitor UHF signal leaks in a cable network includes obtaining and displaying a frequency spectrum of electromagnetic waves in vicinity of a suspected leakage location, to assist a field technician in visually determining if the detected signals resemble QAM signals of a cable network. Although simpler and less expensive than the previously described methods, this method of cable signal leak detection relies on the field technician's knowledge and ability to interpret complex frequency spectra of detected radio waves, which requires extensive training, and may impact veracity and reliability of the test results obtained. Adding to the complexity of relying on visual cues, off-air QAM signals displayed on a frequency spectrum may rarely resemble QAM signals propagating in coaxial cable lines.

SUMMARY

In accordance with an aspect of the disclosure, a spectrum of an electromagnetic wave propagating in vicinity of a cable network may be obtained, and an automatic QAM channel detection may be employed to determine if the obtained spectrum contains a spectral shape of a QAM channel, or channels, currently active in the cable network, thereby alleviating a subjective factor of frequency spectrum interpretation for QAM signal leakage detection. In one embodiment, a field test device may include circuitry for automatically determining which QAM channels are currently active on the cable network, thereby facilitating automatic QAM signal leakage detection.

In accordance with the disclosure, there is provided a testing device for detecting a QAM channel signal leaking at a first location of a cable network, which propagates QAM channel signals at a QAM channel frequency spacing, the testing device comprising:

memory configured to store high and low boundary frequencies of a QAM channel of the QAM channel signal;

a receiver configured to detect an electromagnetic wave propagating in air proximate the first location, and to obtain a frequency spectrum of power density of the electromagnetic wave in a frequency band comprising the high and low boundary frequencies of the QAM channel; and a controller operably coupled to the memory and the receiver and configured to detect the QAM channel signal in the electromagnetic wave by determining that a drop in the power density of the electromagnetic wave, between a frequency higher than the low boundary frequency by a first step frequency and the low boundary frequency, is above a first threshold; and a drop in the power density of the electromagnetic wave, between a frequency lower than the high boundary frequency by a second step frequency and the high boundary frequency, is above the first threshold.

In accordance with an aspect of the disclosure, there is further provided a method of detecting a QAM channel signal leaking at a first location of a cable network, which propagates QAM channel signals frequency-separated at a QAM channel frequency spacing, the method comprising:

obtaining high and low boundary frequencies of a QAM channel of the QAM channel signal; detecting an electromagnetic wave propagating in air proximate the first location, and obtaining a frequency spectrum of power density of the electromagnetic wave in a frequency band comprising the high and low boundary frequencies of the QAM channel; and determining that a drop in the power density of the electromagnetic wave, between a frequency higher than the low boundary frequency by a first step frequency and the low boundary frequency, is above a first threshold; and a drop in the power density of the electromagnetic wave, between a frequency lower than the high boundary frequency by a second step frequency and the high boundary frequency, is above the first threshold, thereby detecting that the QAM channel signal is leaking from the cable network.

In one exemplary embodiment, detecting the QAM channel signal in the electromagnetic wave further comprises determining that an average drop in the power density of the electromagnetic wave, between frequencies higher and lower than the low boundary frequency by the first step frequency and the low boundary frequency, is above a second threshold; and an average drop in the power density of the electromagnetic wave, between frequencies higher and lower than the high boundary frequency by the second step frequency and the high boundary frequency, is above the second threshold. Detecting the QAM channel signal in the electromagnetic wave may further include computing a cross-covariance function between the frequency spectrum and a model function of the QAM channel; locating two neighboring peaks of the cross-covariance function; and determining that the two neighboring peaks are separated by the QAM channel frequency spacing. The first and second step frequencies may be equal to each other.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
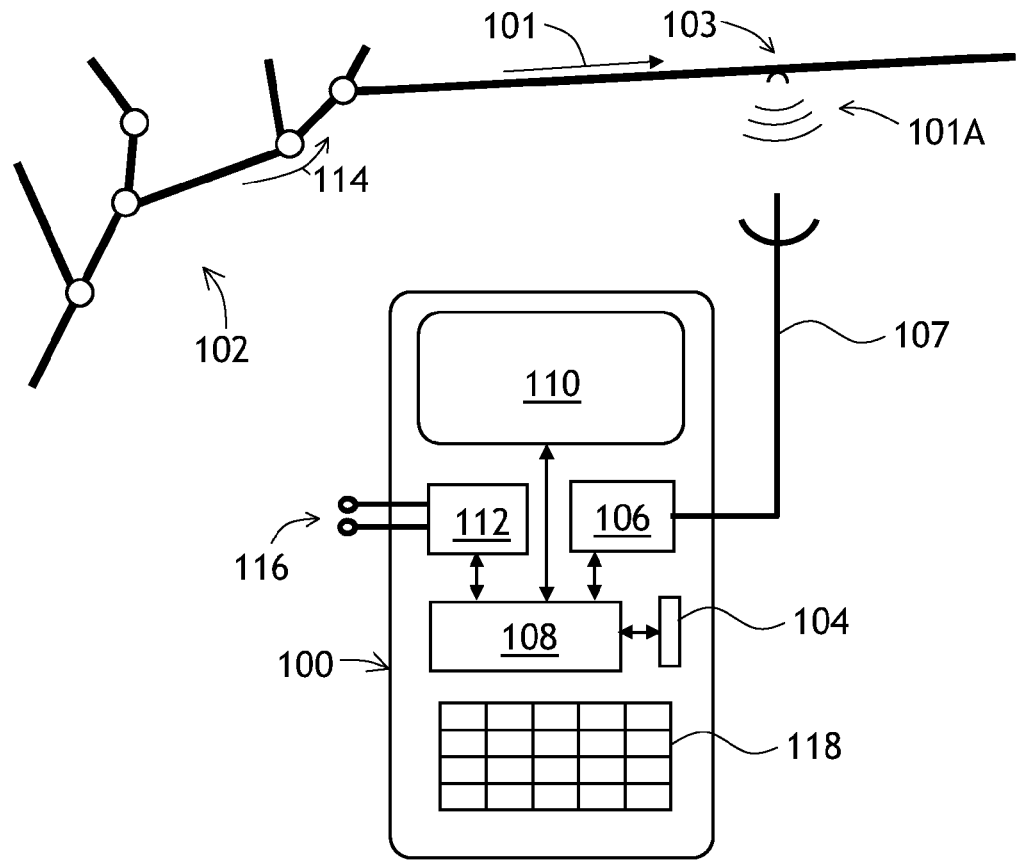
FIG. 1 illustrates a schematic block diagram of a testing device of the present disclosure.
Figure 2:
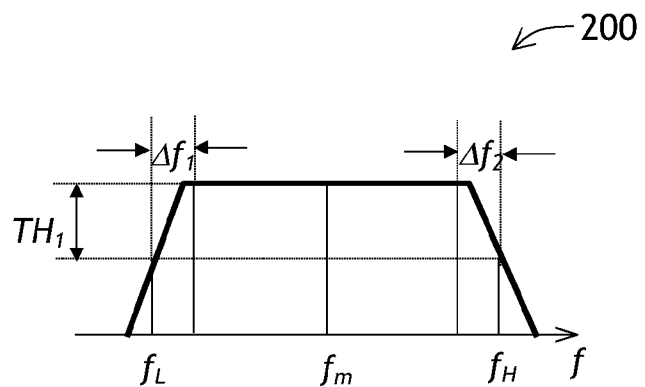
FIG. 2 illustrates a QAM channel frequency spectrum.
Figure 3:
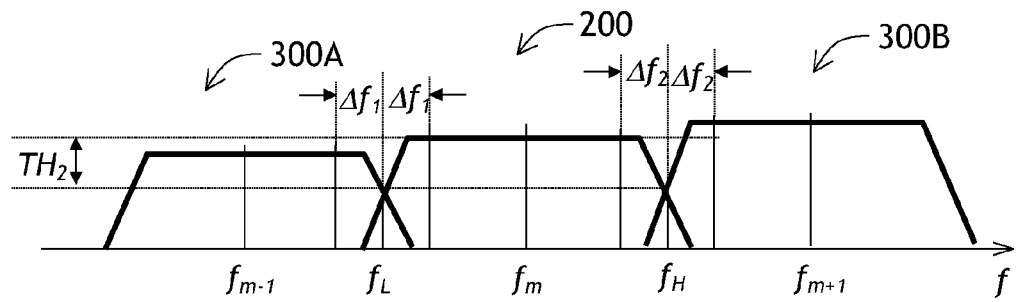
FIG. 3 illustrates a frequency spectrum of three consecutive QAM channels, including the QAM channel of FIG. 2.

Referring to FIGS. 1, 2, and 3, a testing device 100 (FIG. 1) may detect a QAM channel signal 101 leaking at a first location 103 of a cable network 102. The QAM channel signal 101 may include a plurality of QAM channels spaced at a QAM channel frequency spacing, for example, 6 MHz or 8 MHz.

The testing device 100 may include memory 104 configured to store high $f_H$ and low $f_L$ boundary frequencies of a QAM channel 200 (FIG. 2) of the QAM channel signal 101. The high $f_H$ and low $f_L$ boundary frequencies are frequencies at the middle point between center frequencies $f_{m-1}$, $f_m$ and $f_{m+1}$ of neighboring QAM channels 300A and 300B of the QAM channel 200 (FIG. 3). For example, for 6 MHz spaced QAM channels 300A, 200, and 300B, the high $f_H$ and low $f_L$ boundary frequencies are spaced 6 MHz/2=3 MHz from the respective center frequencies $f_{m-1}$, $f_m$ and $f_{m+1}$, and 6 MHz from each other, and for 8 MHz spaced QAM channels 300A, 200, and 300B, the high $f_H$ and low $f_L$ boundary frequencies are spaced 8 MHz/4=4 MHz from the respective center frequencies $f_{m-1}$, $f_m$ and $f_{m+1}$, and 6 MHz from each other. At the high $f_H$ and low $f_L$ boundary frequencies, the spectral density of the QAM channel signal 101 rolls off, or reduces, by a certain amount depending on the modulation format employed.

The testing device 100 may further include a receiver 106 (FIG. 1), which may include an directional antenna 107 for detecting an electromagnetic wave 101A propagating in air proximate the first location 103. The receiver 106 may be configured to obtain a frequency spectrum of power density of the electromagnetic wave 101A in a frequency band comprising the high $f_H$ and low $f_L$ boundary frequencies of the QAM channel 200 (FIG. 2). The testing device 100 (FIG. 1) may further include a controller 108 operably coupled to the memory 104 and the receiver 106 and configured to detect the QAM channel signal 101 in the electromagnetic wave 101A. The controller 108 may detect the QAM channel signal 101 in the electromagnetic wave 101A by determining if a drop of the power density P(f) of the electromagnetic wave 101A, between a frequency higher than the low boundary frequency $f_L$ by a first step frequency $\Delta f_1$ and the low boundary frequency $f_L$ is above a first threshold $TH_1$:

$$P(f_L+\Delta f_1)-P(f_L)>TH_1; \quad (1A)$$

and a drop of the power density P(f) of the electromagnetic wave 101A, between a frequency lower than the high boundary frequency $f_H$ by a second step frequency $\Delta f_2$ and the high boundary frequency $f_H$ is above the first threshold $TH_1$:

$$P(f_H-\Delta f_2)-P(f_H)>TH_1 \quad (1B)$$

The first $\Delta f_1$ and second $\Delta f_2$ step frequencies may be equal to each other, and are preferably smaller than the bandwidth of the QAM channel 200, so that frequencies in the criteria (1A) and (1B) are frequencies of the same QAM channel 200. In other words, the first $\Delta f_1$ and second $\Delta f_2$ step frequencies are preferably less than a bandwidth of the QAM channel 200, or less than a difference between the high $f_H$ and low $f_L$ boundary frequencies.

The criteria (1A) and (1B) may be used by the controller 108 to detect a bandshape of the QAM channel 200 in the spectrum of the electromagnetic wave 101A. Since the QAM channel spacing of the cable network 102 is known, the high $f_H$ and low $f_L$ boundary frequencies of the QAM channel 200, and a center frequency $f_m$ of the QAM channel 200 (FIG. 2) may be obtained. This enables the controller 108 to detect the QAM channel signal 101 in the electromagnetic wave 101A automatically.

The testing device 100 may further include a display 110 operably coupled to the controller 108 for displaying the frequency spectrum including the high $f_H$ and low $f_L$ boundary frequencies, test results, etc. In the embodiment shown, the testing device 100 may include an QAM signal analyzer 112 operably coupled to the controller 108. The QAM signal analyzer 112 may include electrical ports 116 for coupling directly into the cable network 102 to sample and analyze an electrical signal 114 propagating in the cable network 102. The electrical signal 114 may carry the QAM channel signal 101 among other signals. The QAM signal analyzer 112 may analyze the electrical signal 114 to obtain parameters of QAM channels currently active in the cable network 102. The controller 108 may be configured to compute the high $f_H$ and low $f_L$ boundary frequencies from the parameters of currently active QAM channels in the electrical signal 114, and store the high $f_H$ and low $f_L$ boundary frequencies in the memory 104. A keypad 118 operably coupled to the controller 108 may be provided for entering data, causing the controller 108 to process data, for operating the QAM signal analyzer 112, etc.

For a better stability of the QAM channel signal 101 leakage detection in the presence of RF noise, QAM channel detection criteria may be further specified to take into account left 300A and right 300B neighboring channels of the QAM channel 200 (FIG. 3). The QAM channel 200 is shown bounded on both sides by the left 300A and right 300B QAM neighboring channels. To detect presence of the QAM channel signal 101 in the electromagnetic wave 101A when the QAM channel signal 101 includes three channels 200, 300A, and 300B, the controller 108 may be configured to determine if an average drop of the power density P(f) of the electromagnetic wave 101A, between frequencies higher $f_L-\Delta f$ and lower $f_L-\Delta f$ than the low boundary frequency by the first step frequency $\Delta f_1$ and the low boundary frequency $f_L$, is above a second threshold $TH_2$:

$$\tfrac{1}{2}(P(f_L-\Delta f_1)-P(f_L))+\tfrac{1}{2}(P(f_L+\Delta f_1)-P(f_L))>TH_2; \quad (2A)$$

and an average drop of the power density P(f) of the electromagnetic wave 101A, between frequencies higher $f_H+\Delta f$ and lower $f_H-\Delta f$ than the high boundary frequency $f_H$ by the second step frequency $\Delta f_2$ and the high boundary frequency $f_H$, is above the second threshold $TH_2$:

$$\tfrac{1}{2}(P(f_H-\Delta f_2)-P(f_H))+\tfrac{1}{2}(P(f_H+\Delta f_2)-P(f_H))>TH_2 \quad (2B)$$

As in case of the criteria (1A) and (1B), the first $\Delta f_1$ and second $\Delta f_2$ step frequencies may be equal to each other, and are preferably smaller than the bandwidth of the QAM channel 200.

Figure 4A:
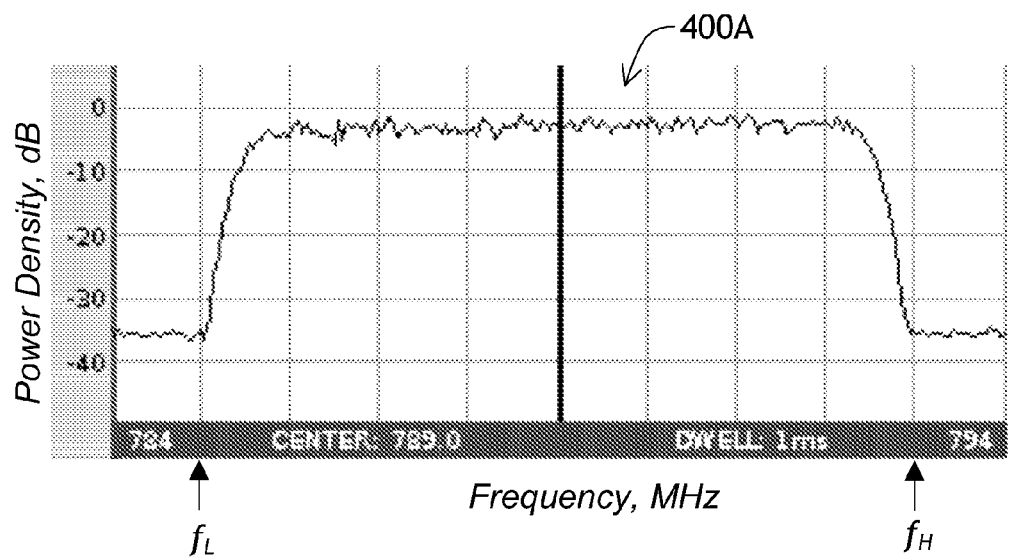
FIGS. 4A and 4B illustrate measured spectra of single 8 MHz-wide and 6 MHz-wide QAM channels, respectively.
Figure 4B:
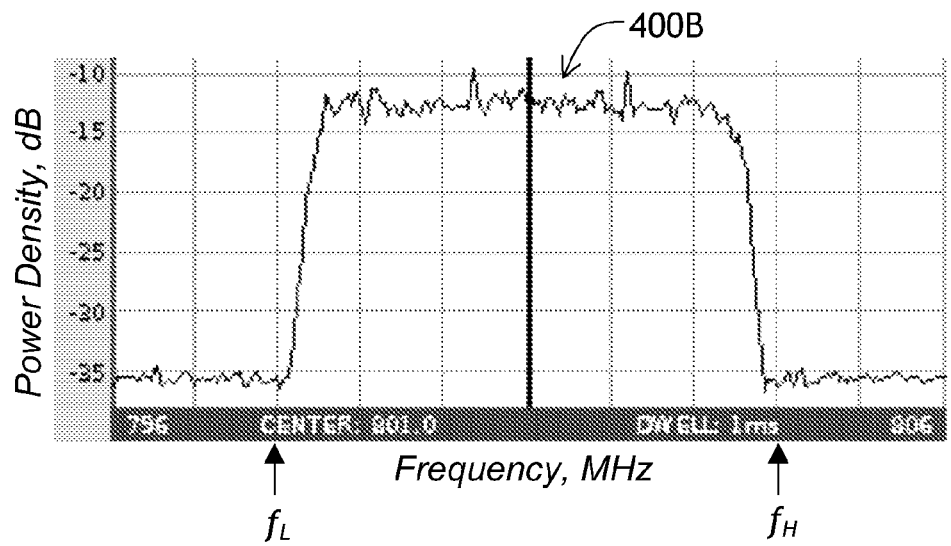
Figure 5:
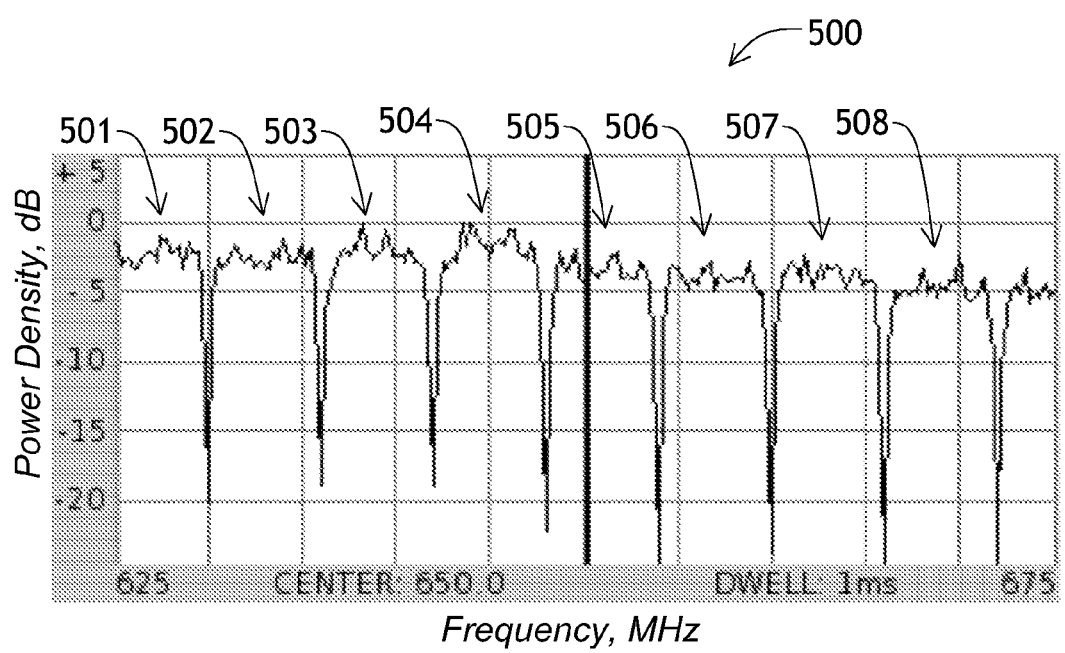
FIG. 5 illustrates a measured spectrum of several consecutive 6 MHz-wide QAM channels.

Referring to FIG. 4A, a measured spectrum 400A of a single 8 MHz-wide and QAM channel at 789 MHz is shown. The corresponding high $f_H$ and low $f_L$ boundary frequencies for the channel 400A are 793 MHz and 785 MHz, respectively. Referring to FIG. 4B, a measured spectrum 400B of a single 6 MHz-wide and QAM channel at 801 MHz is shown. The corresponding high $f_H$ and low $f_L$ boundary frequencies for the channel 400B are 804 MHz and 798 MHz, respectively. One can see from FIGS. 4A and 4B that for individual QAM channels, the first threshold $TH_1$ may be set to a value as large as 25 dB. When neighboring QAM channels are present, the first threshold $TH_1$ may have to be reduced. The first threshold $TH_1$ may be dependent on measured amplitude of the QAM channel signal 101 in the electromagnetic wave 101A and the noise floor of the testing device 100. Turning now to FIG. 5, a spectrum 500 shows eight QAM channels 501 . . . 508, with signal at boundary frequencies between the QAM channels 501 . . . 508 dropping by 10-15 dB below respective QAM channel 501 . . . 508 plateau amplitudes.

Figure 6A:
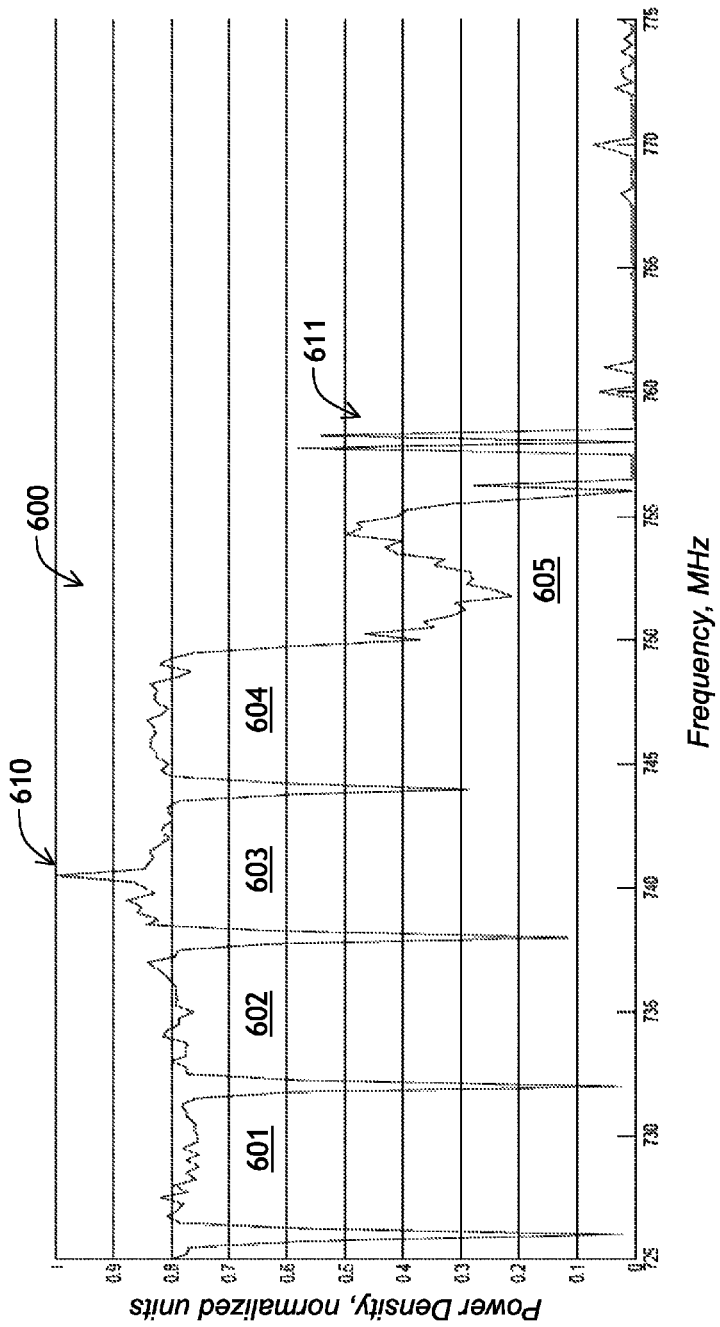
FIG. 6A illustrates a measured spectrum of an electromagnetic wave detected in vicinity of a leakage location of a cable network.
Figure 6B:
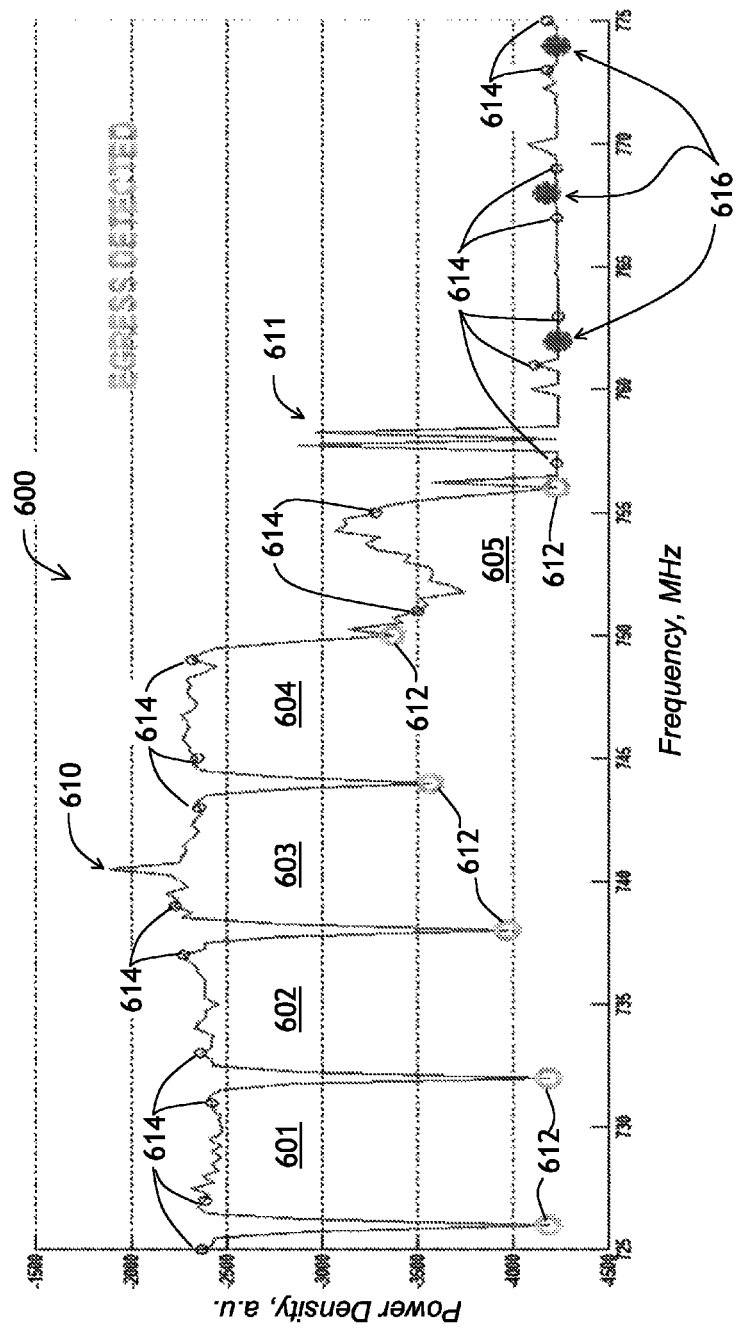
FIG. 6B illustrates detected boundary points of the RF spectrum of FIG. 6A, indicating a leakage of several QAM channel signals.

Turning to FIG. 6A with further reference to FIG. 1, a measured RF spectrum 600 (FIG. 6A) of the electromagnetic wave 101A (FIG. 1) in the frequency range of 725 MHz to 775 MHz is presented. The RF spectrum 600 of the electromagnetic wave 101A was measured in vicinity of a cable shielding opening imitating a leakage location of the cable network 102, such as the first location 103. The RF spectrum 600 includes four 6-MHz QAM channels 601 . . . 604 having boundary frequencies of 726 MHz, 732 MHz, 738 MHz, 744 MHz, and 750 MHz, a 10 MHz wide LTE cellular signal 605 centered at 751 MHz, and some spurious noise 610 at 742 MHz and 611 at 758 MHz. Referring now to FIG. 6B, the criteria (2A) and (2B) above have been applied to the RF spectrum 600 for the boundary frequencies at 726 MHz, 732 MHz, 738 MHz, 744 MHz, 750 MHz, and 756 MHz, with the step frequencies $\Delta f_1 = \Delta f_2 = \Delta f = 1$ MHz, and the second threshold $TH_2$ of 1 dB. Wide circles 612 indicate boundary frequencies which satisfy the criteria (2A) and (2B), and narrow circles 614 indicate frequencies $f_L \pm \Delta f$, $f_H \pm \Delta f$ separated from the boundary frequencies $f_L$, $f_H$ by the frequency step $\Delta_f$ of 1 MHz. One can see that, the criteria (2A) and (2B) correctly detect the four 6-MHz QAM channels 601 . . . 604, as well as indicate the LTE signal 605 as a possible QAM channel. Note that frequencies 616 at 762 MHz, 768 MHz, and 774 MHz, denoted with asterisks ("*") at 616 in FIG. 6B, do not satisfy the criteria (2A) and (2B), and as such were not identified as boundary frequencies of an active QAM channel.

Figure 7:
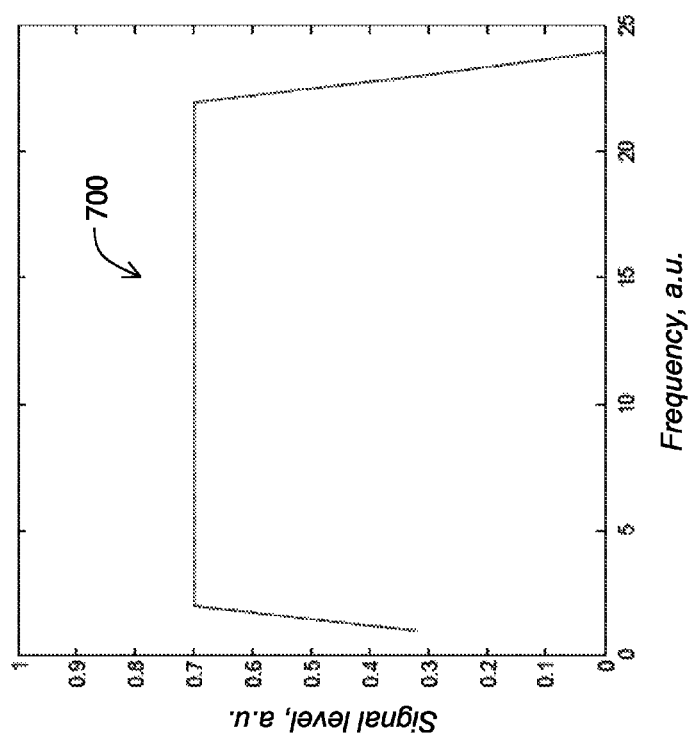
FIG. 7 illustrates a frequency spectrum of a model QAM channel.
Figure 8:
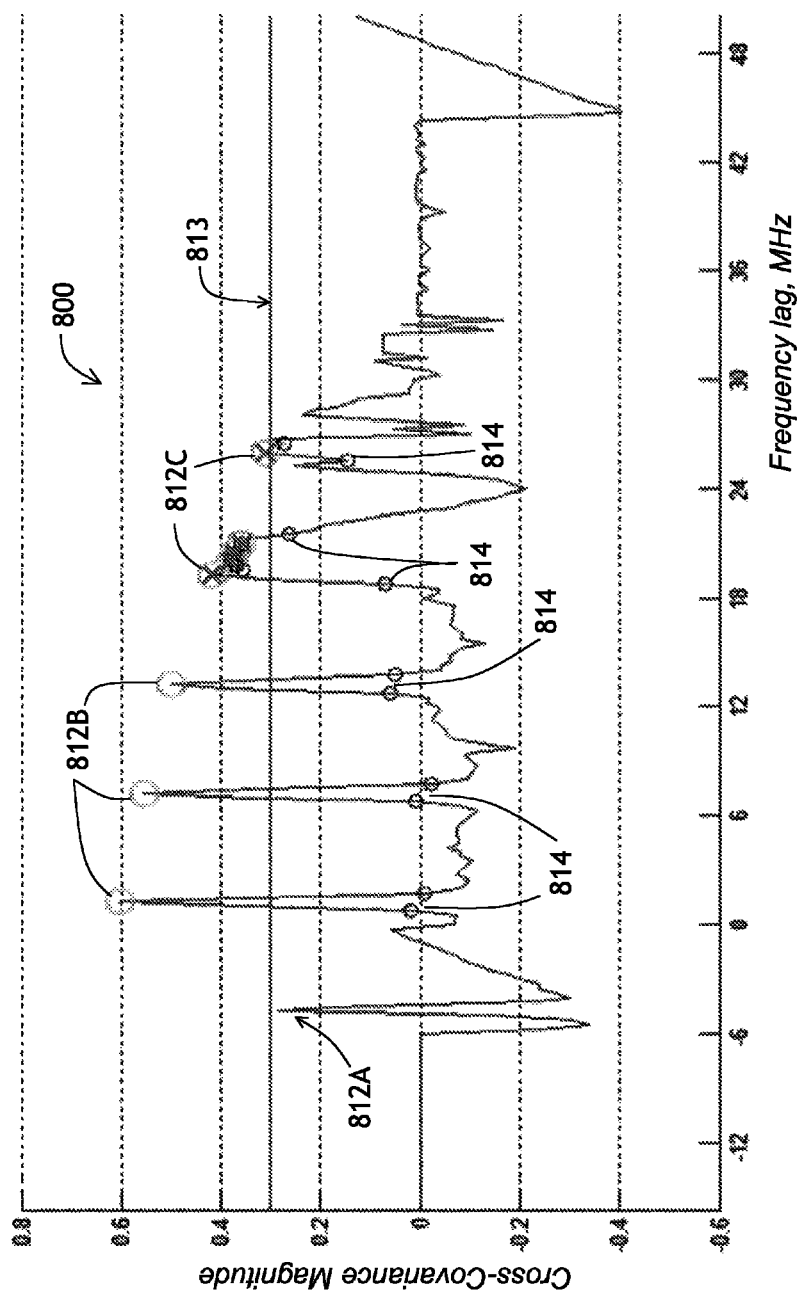
FIG. 8 illustrates a cross-covariance function of a measured RF spectrum of an electromagnetic wave detected in vicinity of the leakage location of a cable network, and the model QAM channel of FIG. 7.

For a better selectivity of QAM channel signal 101 leakage detection, QAM channel detection may include quantitative determination of the presence of a QAM channel shape in a measured frequency spectrum of the electromagnetic wave 101A. Referring to FIGS. 7 and 8 with further reference to FIGS. 1 and 6A, the controller 108 (FIG. 1) may be configured to compute a cross-covariance function between: the measured frequency spectrum, for example the spectrum 600 (FIG. 6A); and a model function of a QAM channel, for example a model function 700 (FIG. 7). A cross-covariance of two functions may be defined as cross-correlation of the two functions with their mean values removed. A cross-covariance function 800 (FIG. 8) has several peaks including: a leftmost peak 812A, three middle peaks 812B denoted with circles, and two rightmost peaks 812C denoted with crosses. The controller 108 may locate the peaks 812A to 812C and determine if neighboring pair or pairs of the peaks 812A to 812C are separated by the QAM channel frequency spacing, 6 MHz in this example. As can be seen in FIG. 8, all the detected peaks 812A to 812C are separated by 6 MHz.

The controller 108 may be further configured to perform a threshold check of the peaks 812A to 812C, that is, to determine whether the peaks 812A to 812C are above a threshold. The threshold may be pre-defined or dynamically assignable. For example, a threshold 813 (FIG. 8) of 0.3 may be selected. The threshold 813 is 0.3 in normalized units, that is, the units where no cross-correlation is zero, and perfect cross-correlation, for example cross-correlation of two identical shapes 700 of FIG. 7, is unity. Still referring to FIG. 8, the leftmost peak 812A is below the threshold 813, and as such, may be discarded from further evaluation. The controller 108 may also be configured to perform a width check of the remaining peaks 812B and 812C, that is, to determine whether each one of neighboring peaks 812B and 812C has a width below a pre-defined or dynamically assignable threshold width. For example, when the threshold is set to 1 MHz, the rightmost peaks 812C may be rejected as too broad; thus, only the three middle peaks 812B may remain available for leakage determination. The width threshold may be checked, for example, by making frequency offsets, e.g. 0.5 MHz as indicated by small circles 814, and checking the signal level drop at the offset frequencies indicated by the small circles 814.

Figure 9:
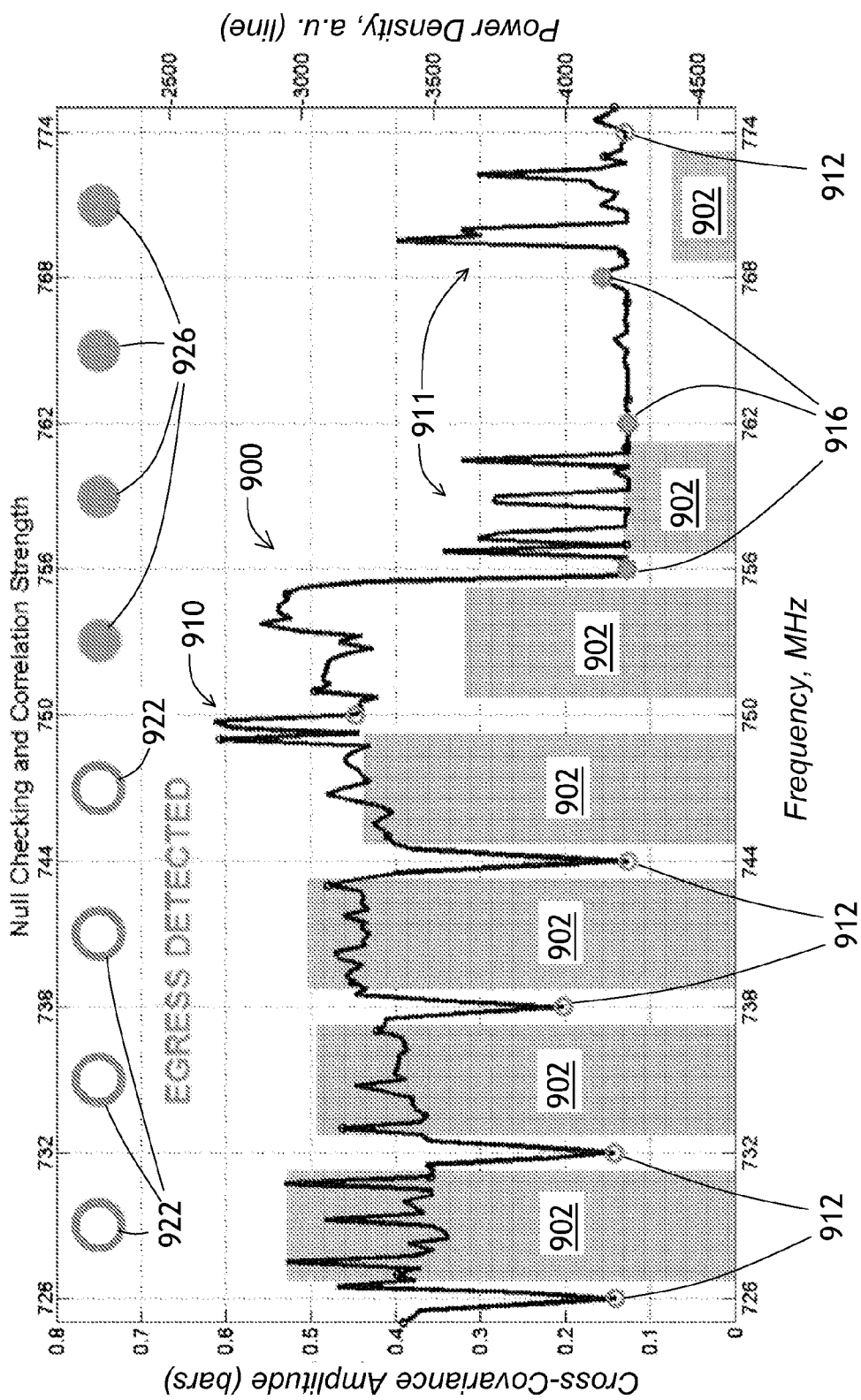
FIG. 9 illustrates an example display of a field test device showing detected leaked QAM channel signals overlapped with a detected RF frequency spectrum.

Referring now to FIG. 9 with further reference to FIG. 1, an example screen on the display 110 of the test device 100 (FIG. 1) includes a detected RF frequency spectrum 900 (FIG. 9) overlapped with vertical bars 902 representing peak amplitudes of the cross-covariance function for corresponding QAM channels. A portion of the RF frequency spectrum 900 between 750 MHz to approximately 756 MHz corresponds to an over-the-air LTE cellular signal, which shows a lower cross-correlation. Peaks 911 at frequencies over 756 MHz represent noise and interference signals present at the time of measurement. Small open circles 912 at 726 MHz, 732 MHz, 738 MHz, 744 MHz, and 774 MHz denote power density at boundary frequencies satisfying the criteria (1A), (1B), (2A), and (2B) above. Small closed circles 916 denote power density at boundary frequencies failing the criteria (1A), (1B), (2A), and (2B). Accordingly, large open circles 922 denote detected leaking QAM channels, and large closed circles 926 denote non-detected QAM channels. Overall, the egress (leakage) of four QAM channels is detected. This corresponds to the four QAM channels 601-604 of FIGS. 6A, 6B.

Figure 10:
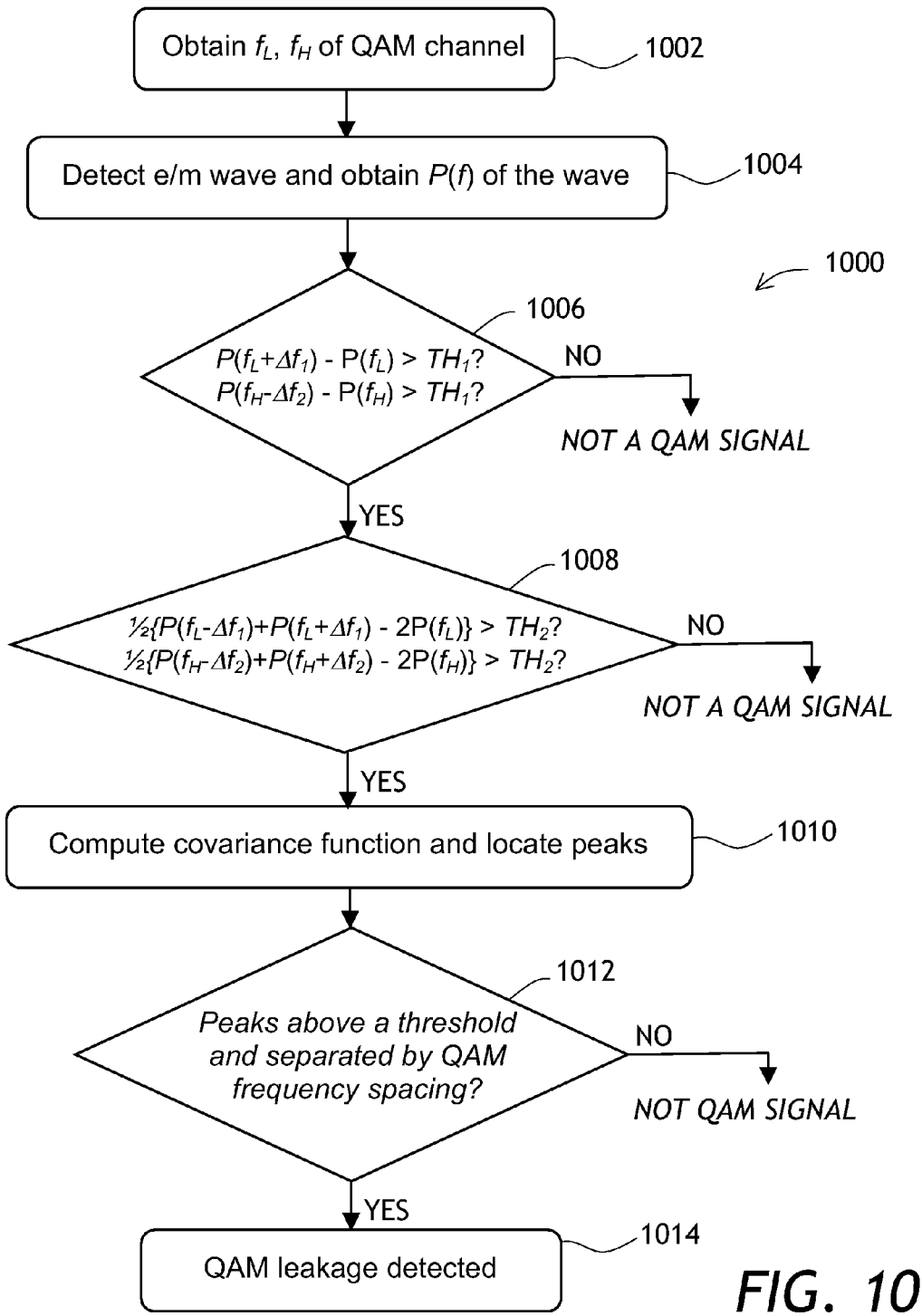
FIG. 10 illustrates a flow chart of a method of detecting a QAM channel signal.

Turning to FIG. 10 with further reference to FIGS. 1 to 3, 6A and 6B, FIG. 8, and FIG. 9, an exemplary method 1000 (FIG. 10) for detecting the QAM channel signal 101 leaking at the first location 103 of the cable network 102 (FIG. 1) is presented. As explained above, the cable network 102 propagates QAM channel signals 101 frequency-separated at a QAM channel frequency spacing, for example 6 MHz or 8 MHz. The method 1000 may include a step 1002 of obtaining high $f_H$ and low $f_L$ boundary frequencies of a QAM channel, for example the QAM channel 200 (FIGS. 2 and 3) of the QAM channel signal 101. In a detecting step 1004, the electromagnetic wave 101A propagating in air proximate the first location 103 is detected, and a frequency spectrum of power density P(f) of the electromagnetic wave 101A in a frequency band comprising the high $f_H$ and low $f_L$ boundary frequencies of the QAM channel, may be obtained. For example, the frequency spectrum 600 (FIG. 6A) may be obtained.

In a first determining step 1006, a check is performed whether a drop of the power density P(f) of the electromagnetic wave 101A, between the frequency $f_L + \Delta f_1$ higher than the low boundary frequency $f_L$ by the first step frequency $\Delta f_1$ and the low boundary frequency $f_L$, is above the first threshold $TH_1$, as denoted by the criterion (1A) above.

Furthermore, a determination is made whether a drop of the power density P(f) of the electromagnetic wave 101A, between the frequency $f_H-\Delta f_2$ lower than the high boundary frequency $f_H$ by the second step frequency $\Delta f_2$ and the high boundary frequency $f_H$, is above the first threshold $TH_1$, as denoted by the criterion (1B) above. Upon determining that the criteria (1A) and (1B) are fulfilled, a determination of leakage of the QAM channel signal 101 from the cable network 102 may be made.

In an optional second determining step 1008, one may determine if the average drop of the power density P(f) of the electromagnetic wave 101A, between frequencies higher $f_L-\Delta\Delta f_1$ and lower $f_L-\Delta f_1$ than the low boundary frequency by the first step frequency $\Delta f_1$ and the low boundary frequency $f_L$, is above a second threshold $TH_2$, as denoted by criterion (2A) above. Furthermore, a determination may be made whether the average drop of the power density of the electromagnetic wave 101A, between frequencies higher $f_H+\Delta f_2$ and lower $f_H-\Delta f_2$ than the high boundary frequency $f_H$ by the step frequency $\Delta f_2$ and the high boundary frequency $f_H$, is above the second threshold $TH_2$, as denoted by criterion (2B) above. By way of an illustrative example, the first threshold may be at least 1.3 dB, and the second threshold may be at least 0.5 dB. Upon determining that the criteria (2A) and (2B) are fulfilled, the detection of leakage of the QAM channel signal 101 from the cable network 102 may be further confirmed.

In an optional third determining step 1010, a computation of the cross-covariance function between: the measured frequency spectrum, for example the spectrum 600 (FIG. 6A); and a model function of a QAM channel, for example a model function 700 (FIG. 7), may be performed. Two neighboring peaks, for example those of the middle peaks 812B of the cross-covariance function 800 (FIG. 8), may be located. In a next step 1012, a check may be performed if these two peaks are separated by the QAM channel frequency spacing. If they are, the detection of leakage of the QAM channel signal 101 from the cable network 102 may be finally confirmed in a step 1014. As explained above, additional checks of the cross-covariance function 800 peaks 812B may be performed as well, for example: determining that each one of the two neighboring peaks of the cross-covariance function has an amplitude above a third threshold, for instance 0.3 in normalized units; and determining that each one of the two neighboring peaks of the cross-covariance function 800 has a spacing of a QAM channel, for example 6 MHz or 8 MHz.

The detected RF frequency spectrum 900 and the vertical bars 902 representing peak amplitudes of the cross-covariance function may be co-displayed (FIG. 9) on the display 110 of the testing device 100 (FIG. 1). When the QAM channel signal 101 is detected in the detected electromagnetic wave 101A, a visual indication of this may be provided. For example, in FIG. 9, the open circles 922 indicate the detected QAM channels.

In one embodiment, the step 1004 of detecting the electromagnetic wave 101A may include pointing the directional antenna 107 (FIG. 1) at the first location 103, perform the remaining steps 1004 to 1014, and then, to confirm that the QAM channel signal 101 is indeed leaking at the first location 103, the directional antenna 107 may be subsequently pointed away from the first location 103, to determine if a magnitude of the cross-covariance function 800 peaks 812B is lessened when the directional antenna 107 is pointed away from the first location 103. If the magnitude indeed lessens, the leakage is considered to indeed originate from the first location.

To facilitate determination of the leakage location, an audible signal may be sounded by the testing device 100. The audible signal may be made dependent on a current magnitude of the cross-covariance function 800 peaks 812B. For example, the loudness of the audible signal, the pitch of the audible signal, or another suitable parameter may be made dependent on the magnitude of the cross-covariance function 800 peaks 812B, to facilitate the leakage detection without having to look at the display 110 of the test device 100.

The method 1000 may include sampling and analyzing the electrical signal 114 propagating in the cable network 102 (FIG. 1), to obtain parameters of QAM channels currently active in the cable network 102 using the QAM signal analyzer 112. The high $f_H$ and low $f_L$ boundary frequencies may be then computed from the parameters of currently active QAM channels in the electrical signal 114. Such parameters may include, for example, center frequencies or channel numbers of the QAM channels currently active on the cable network 102.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A testing device for detecting a quadrature amplitude modulated (QAM) channel signal leaking at a first location of a cable network, which propagates QAM channel signals at a QAM channel frequency spacing, the testing device comprising:

memory to store high and low boundary frequencies of a QAM channel of the QAM channel signal;

a receiver to detect an electromagnetic wave propagating in air proximate to the first location, and to obtain a frequency spectrum of power density of the electromagnetic wave in a frequency band comprising the high and low boundary frequencies of the QAM channel; and a controller operably coupled to the memory and the receiver and to detect the QAM channel signal in the electromagnetic wave by:
computing a cross-covariance function between the frequency spectrum and a model function of the QAM channel;
locating two neighboring peaks of the cross-covariance function; and
determining that the two neighboring peaks are separated by the QAM channel frequency spacing.

2. The testing device of claim 1, further comprising a QAM signal analyzer operably coupled to the controller and to sample and analyze an electrical signal propagating in the cable network and to obtain parameters of QAM channels currently active in the cable network.

3. The testing device of claim 2, wherein the controller is further to compute the high and low boundary frequencies from the parameters of the currently active QAM channels, and to store the high and low boundary frequencies in the memory.

4. The testing device of claim 1, wherein the receiver includes a directional antenna operably coupled to the receiver and to detect the electromagnetic wave.

5. The testing device of claim 1, further comprising a display operably coupled to the controller and to display the frequency spectrum.

6. The testing device of claim 1, wherein the controller is further configured detect the QAM channel in the electromagnetic wave by determining that a drop in the power density of the electromagnetic wave between a frequency higher than the low boundary frequency by a first step frequency and the low boundary frequency is above a first threshold; and a drop in the power density of the electromagnetic wave between a frequency lower than the high boundary frequency by a second step frequency and the high boundary frequency is above the first threshold.

7. The testing device of claim 6, wherein the first and second step frequencies are less than a bandwidth of the QAM channel.

8. A method of detecting a quadrature amplitude modulated (QAM) channel signal leaking at a first location of a cable network, which propagates QAM channel signals frequency-separated at a QAM channel frequency spacing, the method comprising:
obtaining high and low boundary frequencies of a QAM channel of the QAM channel signal;
detecting an electromagnetic wave propagating in air proximate to the first location and obtaining a frequency spectrum of power density of the electromagnetic wave in a frequency band comprising the high and low boundary frequencies of the QAM channel; and
detecting the QAM channel signal in the electromagnetic wave by:
computing a cross-covariance function between: the frequency spectrum, and a model function of the QAM channel;
locating two neighboring peaks of the cross-covariance function; and
determining that the two neighboring peaks are separated by the QAM channel frequency spacing.

9. The method of claim 8, further comprising:
sampling and analyzing an electrical signal propagating in the cable network to obtain parameters of QAM channels currently active in the cable network; and
computing the high and low boundary frequencies from the parameters of the currently active QAM channels.

10. The method of claim 8, wherein the step of detecting the electromagnetic wave comprises pointing a directional antenna at the first location, and wherein the method further comprises confirming that the QAM channel signal is leaking at the first location by subsequently pointing the directional antenna away from the first location, and determining that a magnitude of a peak of the cross-covariance function is lessened when the directional antenna is pointed away from the first location.

11. The method of claim 8, further comprising sounding an audible signal, wherein the audible signal is dependent on a current magnitude of a peak of the cross-covariance function.

12. The method of claim 8, further comprising determining that:
a drop in the power density of the electromagnetic wave between a frequency higher than the low boundary frequency by a first step frequency and the low boundary frequency is above a first threshold; and a drop in the power density of the electromagnetic wave between a frequency lower than the high boundary frequency by a second step frequency and the high boundary frequency is above the first threshold.

13. The method of claim 12, wherein the first step frequency is equal to the second step frequency.

14. The method of claim 12, wherein the first and second step frequencies are less than a bandwidth of the QAM channel.

15. A testing device for detecting a quadrature amplitude modulated (QAM) channel signal leaking at a first location of a cable network, which propagates QAM channel signals at a QAM channel frequency spacing, the testing device comprising:
memory to store high and low boundary frequencies of a QAM channel of the QAM channel signal;
a receiver to detect an electromagnetic wave propagating in air proximate to the first location, and to obtain a frequency spectrum of power density of the electromagnetic wave in a frequency band comprising the high and low boundary frequencies of the QAM channel; and
a controller operably coupled to the memory and the receiver and to detect the QAM channel signal in the electromagnetic wave by:
computing a cross-covariance function between: the frequency spectrum and a model function of the QAM channel;
locating two neighboring peaks of the cross-covariance function; and
determining that each one of the two neighboring peaks has an amplitude above a threshold.

16. The testing device of claim 15, wherein detecting the QAM channel signal in the electromagnetic wave further comprises determining that the two neighboring peaks are separated by the QAM channel frequency spacing.

17. The testing device of claim 15, further comprising a QAM signal analyzer operably coupled to the controller and to sample and analyze an electrical signal propagating in the cable network and to obtain parameters of QAM channels currently active in the cable network.

18. The testing device of claim 17, wherein the controller is further to compute the high and low boundary frequencies from the parameters of the currently active QAM channels, and to store the high and low boundary frequencies in the memory.

19. The testing device of claim 15, wherein the receiver includes a directional antenna operably coupled to the receiver and to detect the electromagnetic wave.

20. The testing device of claim 15, further comprising a display operably coupled to the controller and to display the frequency spectrum.

* * * * *